(12) United States Patent
Akiyama

(10) Patent No.: US 12,248,138 B2
(45) Date of Patent: Mar. 11, 2025

(54) LIGHT DEFLECTOR AND MANUFACTURING METHOD

(71) Applicant: STANLEY ELECTRIC CO., LTD., Tokyo (JP)

(72) Inventor: Keita Akiyama, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 605 days.

(21) Appl. No.: 17/616,605

(22) PCT Filed: May 20, 2020

(86) PCT No.: PCT/JP2020/019976
§ 371 (c)(1),
(2) Date: Dec. 3, 2021

(87) PCT Pub. No.: WO2020/246245
PCT Pub. Date: Dec. 10, 2020

(65) Prior Publication Data
US 2022/0236556 A1 Jul. 28, 2022

(30) Foreign Application Priority Data
Jun. 6, 2019 (JP) .................. 2019-106111

(51) Int. Cl.
*G02B 26/08* (2006.01)
*G02B 26/10* (2006.01)
(Continued)

(52) U.S. Cl.
CPC ......... *G02B 26/0858* (2013.01); *H02N 2/028* (2013.01); *H02N 2/22* (2013.01); *G02B 26/105* (2013.01)

(58) Field of Classification Search
CPC ............. G02B 26/0858; G02B 26/105; G02B 26/0833; G02B 26/0816; G02B 26/101;
(Continued)

(56) References Cited

U.S. PATENT DOCUMENTS

| 2004/0060898 A1* | 4/2004 | Tsai ................... G02B 26/0833 216/2 |
| 2007/0008401 A1 | 1/2007 | Cannon et al. |
| 2012/0062970 A1 | 3/2012 | Yamada et al. |

FOREIGN PATENT DOCUMENTS

| EP | 3276393 A1 | 1/2018 |
| JP | 2006319387 A | 11/2006 |

(Continued)

OTHER PUBLICATIONS

JP 2014102354 to Masanao, Jun. 5, 2014, English language machine translation generated Jun. 11, 2024 (Year: 2014).*

(Continued)

*Primary Examiner* — Derek S. Chapel
*Assistant Examiner* — Adam W Booher
(74) *Attorney, Agent, or Firm* — Holtz, Holtz & Volek PC

(57) ABSTRACT

A light deflector includes a mirror part, a pair of torsion bars, inside piezoelectric actuators, and a movable frame part. The crystal orientation in the axial direction of the torsion bars is set to <100>. In the joint edge portions of the torsion bars and the inside piezoelectric actuators, radius parts are oriented to <110> and each formed by a curved surface recessed inward. The amount of waviness about a roughness curve derived from the curved surface is set within 600 nm.

4 Claims, 10 Drawing Sheets

(51) Int. Cl.
*H02N 2/00* (2006.01)
*H02N 2/02* (2006.01)

(58) Field of Classification Search
CPC ........ H02N 2/028; H02N 2/22; B81B 3/0072; B81B 3/0075
See application file for complete search history.

(56) References Cited

FOREIGN PATENT DOCUMENTS

| | | | |
|---|---|---|---|
| JP | 2012063413 A | 3/2012 | |
| JP | 2014102354 A | 6/2014 | |
| JP | 2017151476 A | 8/2017 | |
| WO | 2010131557 A1 | 11/2010 | |

OTHER PUBLICATIONS

Landesberger et al., Influence of Wafer Grinding and Etching Techniques on the Fracture Strength of Thin Silicon Substrates, Advanced Materials Research, vol. 325, pp. 659-665, Aug. 22, 2011 (Year: 2011).*
Extended European Search Report (EESR) dated May 24, 2023, issued in counterpart European Application No. 20818091.9.
Satoshi, et al., "Influence of ICP Etching Damage on the Brittle-Fracture Strength of Single-Crystal Silicon", Journal of the Society of Materials Science, vol. 56, No. 10, pp. 920-925, Retrieved from the Internet: URL:https://www.istage.jst.go.jp/article/j sms/56/10/56_10_920/_pdf>.
International Search Report (ISR) (and English translation thereof) dated Jun. 16, 2020 issued in International Application No. PCT/JP2020/019976.
Written Opinion dated Jun. 16, 2020 issued in International Application No. PCT/JP2020/019976.

* cited by examiner

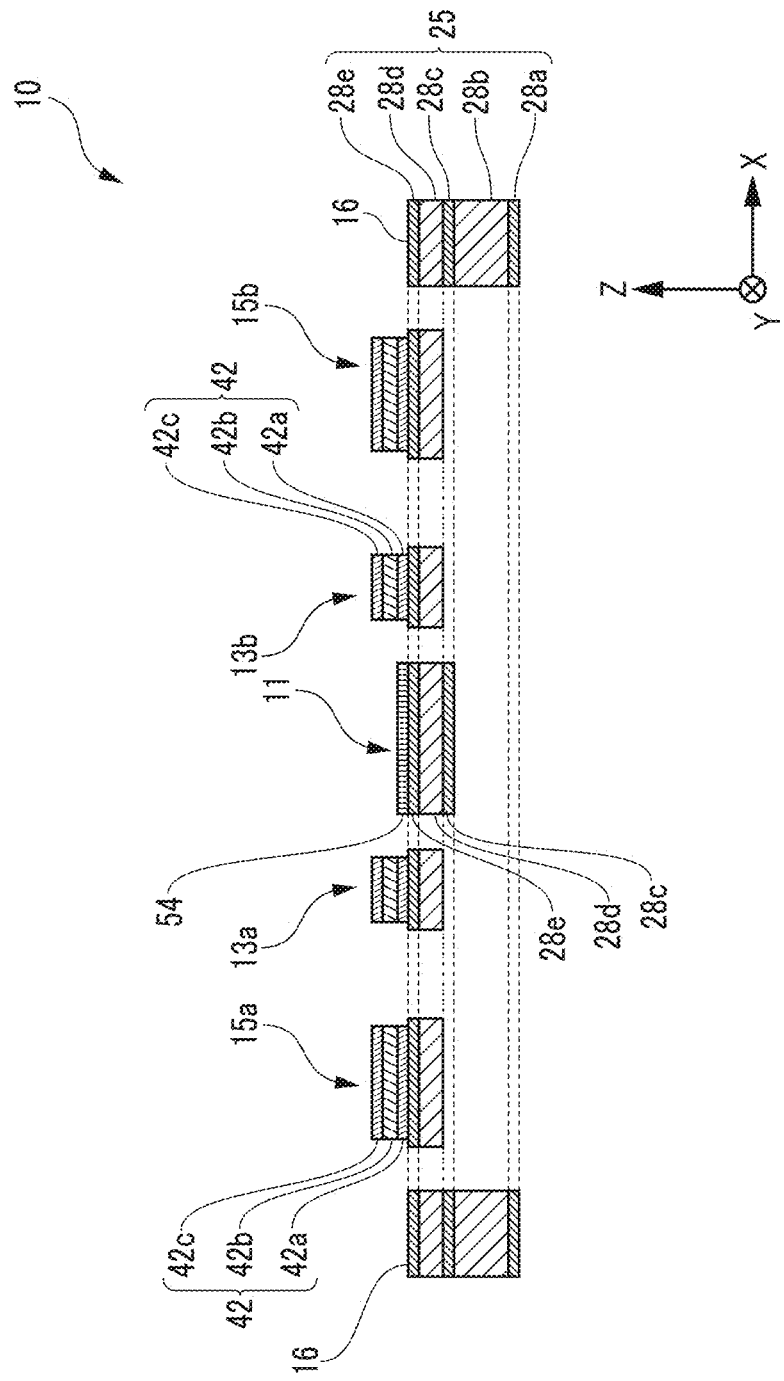

LIGHT DEFLECTOR AND MANUFACTURING METHOD

TECHNICAL FIELD

The present invention relates to a light deflector for MEMS and a manufacturing method therefor.

BACKGROUND ART

There is known a light deflector for piezoelectric MEMS (For example, Patent literature 1).

In the light deflector of Patent Literature 1, a joint edge of a mirror part and each of torsion bars is formed by radius parts recessed inward to prevent damage to the joint portion of the mirror part and each of the torsion bars.

CITATION LIST

Patent Literature

Patent Literature 1: Japanese Patent Application Laid-Open No. 2017-151476

SUMMARY OF INVENTION

Technical Problem

A light deflector for general piezoelectric MEMS uses an SOI (Silicon on Insulator) wafer as the substrate. The plane index of the principal surface of a general SOI wafer is (100) or (110).

On the other hand, when the frequency of reciprocal turning of a mirror part about the axis of torsion bars increases, it is preferred to increase the rigidity of the torsion bars in a twisting direction. Therefore, the light deflector is manufactured to adjust the crystal orientation of the torsion bars in the axial direction to <100>.

However, when the crystal orientation of the torsion bars in the axial direction is set to <100>, the normal direction becomes <110> as a cleavage direction of silicon single crystal at a point on the curved line of the radius part. Since the cleavage direction is a direction easy to form a crack and cause the crack to grow, it will be easier to form a crack at the point and break the torsion bar.

It is an object of the present invention to provide a light deflector and a manufacturing method therefor capable of preventing the cleavage of a radius part provided in a joint edge portion of each of torsion bars.

Solution to Problem

A light deflector of the present invention includes:

a mirror part which can turn reciprocally about a predetermined rotation axis;

a pair of torsion bars extending from both sides of the mirror part along the rotation axis of the mirror part;

a frame part which surrounds the mirror part and the pair of torsion bars;

a plurality of piezoelectric actuators which intervenes between each torsion bar and the frame part to cause torsional vibration of each torsion bar about the rotation axis so as to reciprocally turn the mirror part about the rotation axis;

first radius parts each of which is formed by a cylindrical curved surface recessed inward in a joint edge portion between each torsion bar and the mirror part; and second radius parts each of which is formed by a cylindrical curved surface recessed inward in a joint edge portion between each piezoelectric actuator on a side facing the mirror part and each torsion bar, wherein a substrate layer of the mirror part, the torsion bars, and the piezoelectric actuators is a common silicon single crystal layer, a plane index of a principal surface of the silicon single crystal layer is either one of (100) and (110), an axial direction of the torsion bars is <100> as a crystal orientation of the silicon single crystal layer, and at least a predetermined section of either one of the first radius parts and the second radius parts is so formed that unevenness with respect to the cylindrical curved surface is 600 nm or less.

According to the present invention, either one of the predetermined sections of the first radius parts and second radius parts can be so formed that unevenness with respect to the cylindrical curved surface is 600 nm or less. Thereby, at least either one cleavage can be suppressed.

Preferably, both ends of the predetermined section in the light deflector of the present invention are set outside of both ends of a center divided section when the cylindrical curved surface is divided into three equal sections.

Since the axial direction of the torsion bars is the crystal orientation of <100> of the silicon single crystal layer, a cleavage direction in each of the first radius parts and second radius parts exists within the center divided section when the cylindrical curved surface is divided into three equal sections. According to this structure, the suppression of cleavage in a range including a cleavage direction in at least either one of the first radius parts and the second radius parts can be guaranteed.

Preferably, in the light deflector of the present invention, the at least ether one is so formed that a contour line when each radius part is cut out on a plane parallel to the principal surface is set as a waviness curve, an average line of waviness curves is set by a method of least squares, an adjacent peak to peak section of the waviness curve is set as a cycle, a distance from the average line at each position of the waviness curve is set as the amount of waviness, and a difference between the maximum amount of waviness and the minimum amount of waviness of the predetermined section in each cycle is 600 nm or less over the whole cycle included in the predetermined section.

According to this structure, the amount of waviness of the predetermined section can be suppressed to suppress the cleavage of the first radius parts and the second radius parts.

Preferably, the plane in the light deflector of the present invention is at least either one surface.

The surface of each of the first radius parts and the second radius parts is located in a shallow position from the surface of the light deflector. According to this structure, it is easy to detect a contour line of each of the first radius parts and the second radius parts.

Preferably, the at least either one in the light deflector of the present invention is the second radius parts.

The torsion bars receive a torsional force about the rotation axis from each of the piezoelectric actuators and transmit it to the mirror part. Therefore, a stronger torsional force is applied to the second radius parts than to the first radius parts during the operation of the light deflector.

According to this structure, the life of the torsion bars can be extended by suppressing unevenness by giving priority to the first radius parts over the second radius parts.

A manufacturing method of the present invention includes:

a coating process in which the surface of a substrate including an active layer of silicon single crystal with a plane index of a principal surface being either one of (100) and (110) is covered with a photoresist film with a film thickness of not thinner than 5 μm and not thicker than 10 μm;

an exposure process in which the surface side of the substrate after the coating process is exposed through a photomask including a contour pattern of contours of the mirror part, the torsion bars, the piezoelectric actuators, the first radius parts, and the second radius parts of the light deflector; and a contouring process in which the surface side of the substrate is etched to form, on the active layer, the contours of the mirror part, the torsion bars, the piezoelectric actuators, the first radius parts, and the second radius parts of the light deflector.

According to the manufacturing method of the present invention, it can guarantee the amount of waviness of the curved surface of each of the first radius parts and second radius parts within 600 nm to suppress the cleavage of the radius part in the joint portion of the torsion bar.

BRIEF DESCRIPTION OF DRAWINGS

FIG. 11 is a cross-sectional view of the light deflector manufactured by the manufacturing method of FIG. 10.

DESCRIPTION OF EMBODIMENT

Figure 1:
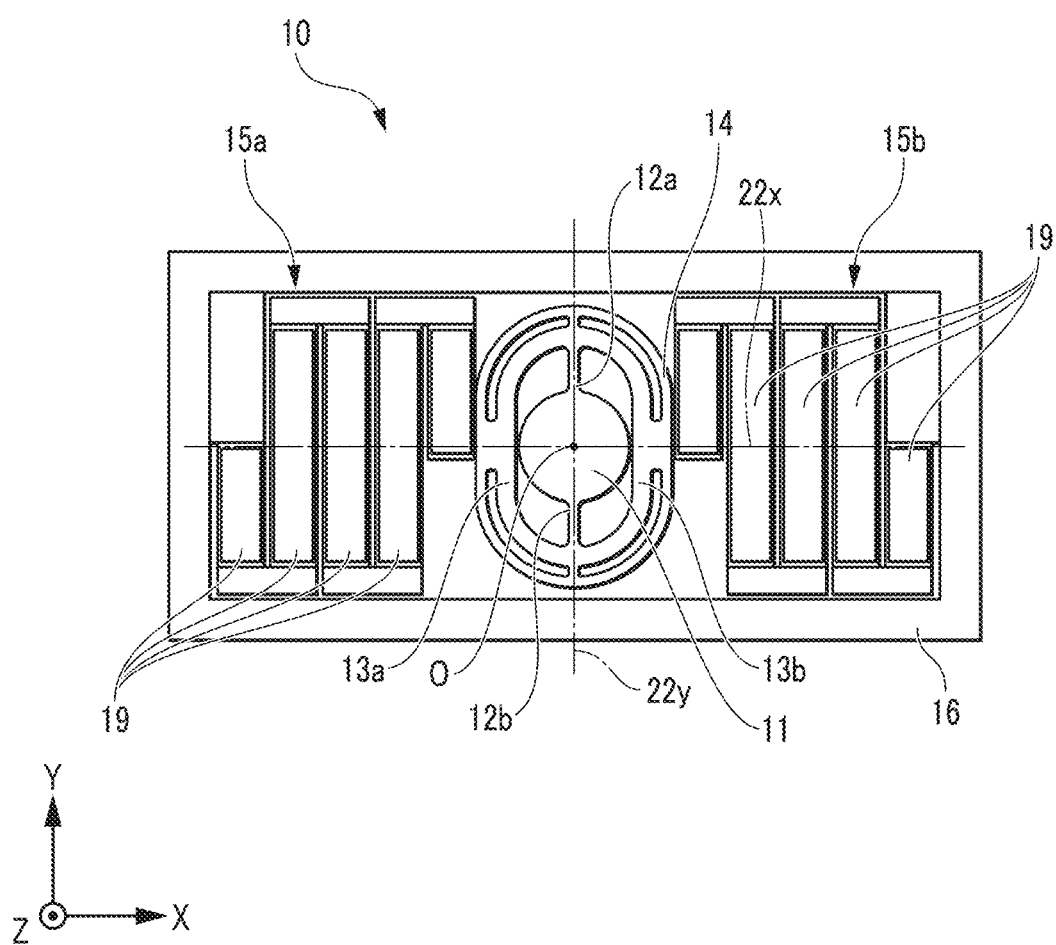
FIG. 1 is a front view of a MEMS light deflector.

A preferred embodiment of the present invention will be described in detail below. In the following description, a common reference numeral is used for substantially identical or equivalent elements and parts. Further, as for elements or parts having the same structure but different only in arrangement position, a reference numeral with the same numeral but different only in alphabet letter attached is used. Further, when not distinguishing individually between the elements or parts having the same numeral but different only in alphabet letter attached, only the numeral is collectively attached to the elements or parts by omitting the alphabet letter(s) attached.

[MEMS Light Deflector]

FIG. 1 is a front view of a MEMS light deflector 10 (as seen from the front side). The light deflector 10 includes, as main elements, a mirror part 11, torsion bars 12a, 12b, inside piezoelectric actuators 13a, 13b, a movable frame part 14, outside piezoelectric actuators 15a, 15b, and a fixed frame part 16.

In the following, a three axis coordinate system consisting of X axis, Y axis, and Z axis is defined for convenience of description. The X axis and the Y axis are set to a horizontal direction and a vertical direction of the light deflector 10 in front view. The Z axis is set to a thickness direction of the light deflector 10. O is the center of the round mirror part 11.

The mirror part 11 can turn reciprocally about rotation axes 22x and 22y orthogonal to each other at the center O. The rotation axes 22x and 22y are parallel to the X axis and the Y axis, respectively, when the mirror part 11 faces straight ahead.

A pair of torsion bars 12a, 12b are extending from both sides of the mirror part 11 along the rotation axis 22y. A pair of inside piezoelectric actuators 13a, 13b are joined to each other in the X axis direction to have an elliptical ring shape vertically long as a whole. The elliptical ring is surrounding the mirror part 11 and the torsion bars 12a, 12b.

The movable frame part 14 has an elliptical ring shape larger than the elliptical ring formed by the pair of inside piezoelectric actuators 13a, 13b. The elliptical ring is surrounding the elliptical ring of the pair of inside piezoelectric actuators 13a, 13b. Each of the inside piezoelectric actuators 13a, 13b is joined to the inner circumference of the movable frame part 14 on the straight line of the X axis direction that passes through the center O.

Each of the outside piezoelectric actuators 15a, 15b intervenes between the movable frame part 14 and the fixed frame part 16. Each of the outside piezoelectric actuators 15a, 15b is equipped with plural cantilevers 19 the vertical direction of which is aligned to the Y axis. Cantilevers 19 adjacent to each other in the X axis direction are coupled to each other either on one edge or the other edge in the Y axis direction. The coupling points are alternate from one to the other in the Y axis direction in order of alignment of the cantilevers 19 in the X axis direction. Thus, the plural cantilevers 19 in each of the outside piezoelectric actuators 15a, 15b constitute a coupling body having a meander pattern as a whole.

The outside piezoelectric actuators 15a, 15b are driven by a drive voltage from an unillustrated drive voltage supply unit to cause the movable frame part 14 to turn reciprocally about the rotation axis (≠rotation axis 22x) in the X axis direction that passes through the center O at a non-resonant frequency. Thus, the mirror part 11 reciprocally turns about the rotation axis 22x at the non-resonant frequency.

The inside piezoelectric actuators 13a, 13b are driven by another drive voltage from the unillustrated drive voltage supply unit to cause the torsion bars 12a, 12b to torsionally vibrate about the rotation axis 22y at a resonance frequency. Thus, the mirror part 11 reciprocally turns about the rotation axis 22y at the resonance frequency.

[SOI Wafer]

Figure 2A:
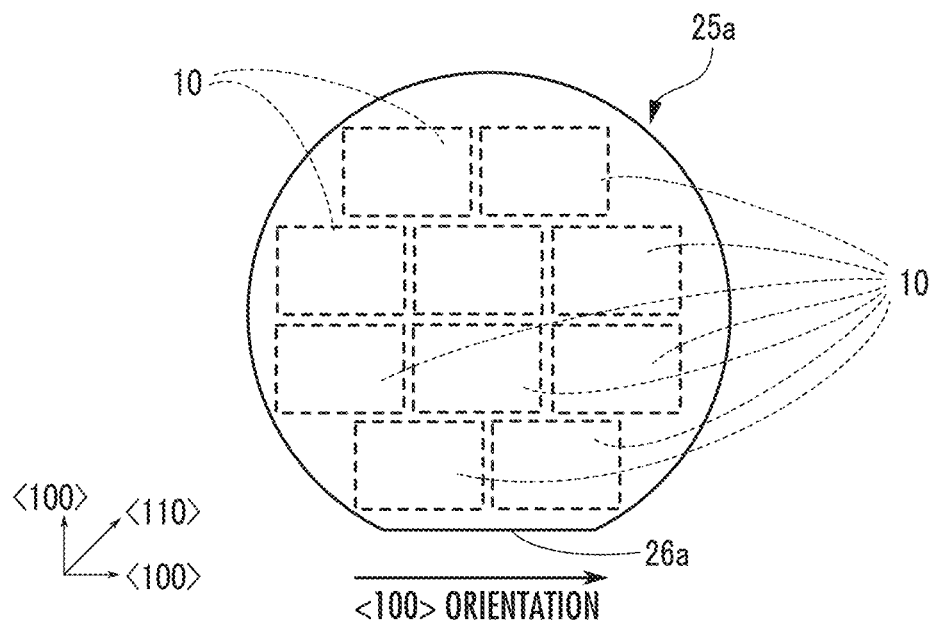
FIG. 2A is a front view of an SOI wafer used in the manufacture of the light deflector.
Figure 2B:
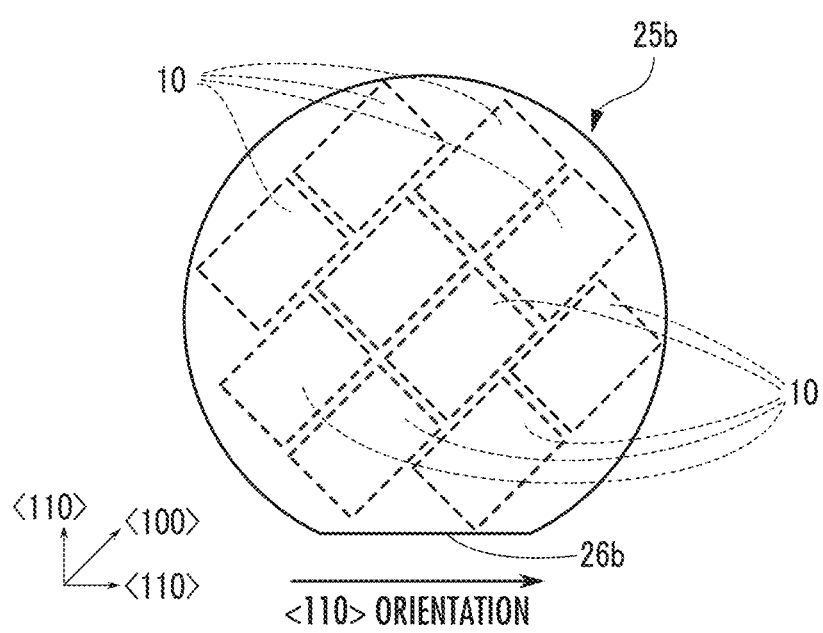
FIG. 2B is a front view of another SOI wafer used in the manufacture of the light deflector.

FIG. 2A and FIG. 2B are front views of SOI wafers 25a and 25b used in the manufacture of the light deflector 10, respectively. The front of each SOI water 25 is a principal surface on the surface side of the SOI wafer 25.

The coordinate axes illustrated in FIG. 2A and FIG. 2B represent crystal orientations inside an active layer 28d (FIG. 11) formed of silicon single crystal in each SOI wafer 25. An orientation flat 26 represents the crystal orientation of the active layer 28d (silicon single crystal layer) of the SOI wafer 25.

Multiple light deflectors 10 are cut out of each SOI wafer 25. In FIG. 2A and FIG. 2B, the outline of each light deflector 10 is represented by a rectangular dashed line. The long and short sides of the rectangle correspond to the horizontal side (long side) and the vertical side (short side) of the fixed frame part 16 of the light deflector 10 in the front view of FIG. 1, respectively.

An orientation flat 26a is in a direction of <100>. Therefore, the plane index of the principal surface of the SOI wafer 25a is (100). On the other hand, an orientation flat 26b is in a direction of <110>. Therefore, the plane index of the principal surface of a support layer 28b is (110).

As will be described with reference to FIG. 11 later, a substrate layer of the light deflector 10 is made up of the active layer 28d of the SOI wafer 25. The dashed rectangle in FIG. 2 represents the outline of each light deflector 10. Therefore, the axial direction (=extension direction) of the torsion bars 12a. 12b are <100> in both of the SOI wafers 25a and 25b. This is because adjusting the axial direction of the torsion bars 12a, 12b to <100> is advantageous to increase the resonance frequency of the mirror part 11 about the rotation axis 22y. When the axial direction of the torsion bars 12a, 12b is adjusted to <100>, the torsional rigidity of the torsion bars 12a, 12b increases.

Therefore, in the SOI wafer 25a, the axial direction of the torsion bars 12a, 12b becomes a direction orthogonal to the orientation flat 26a. On the other hand, in the SOI wafer 25b, the axial direction of the torsion bars 12a. 12b becomes a direction at an angle of 45° with respect to the orientation flat 26b.

[Radius Part]

Figure 3:
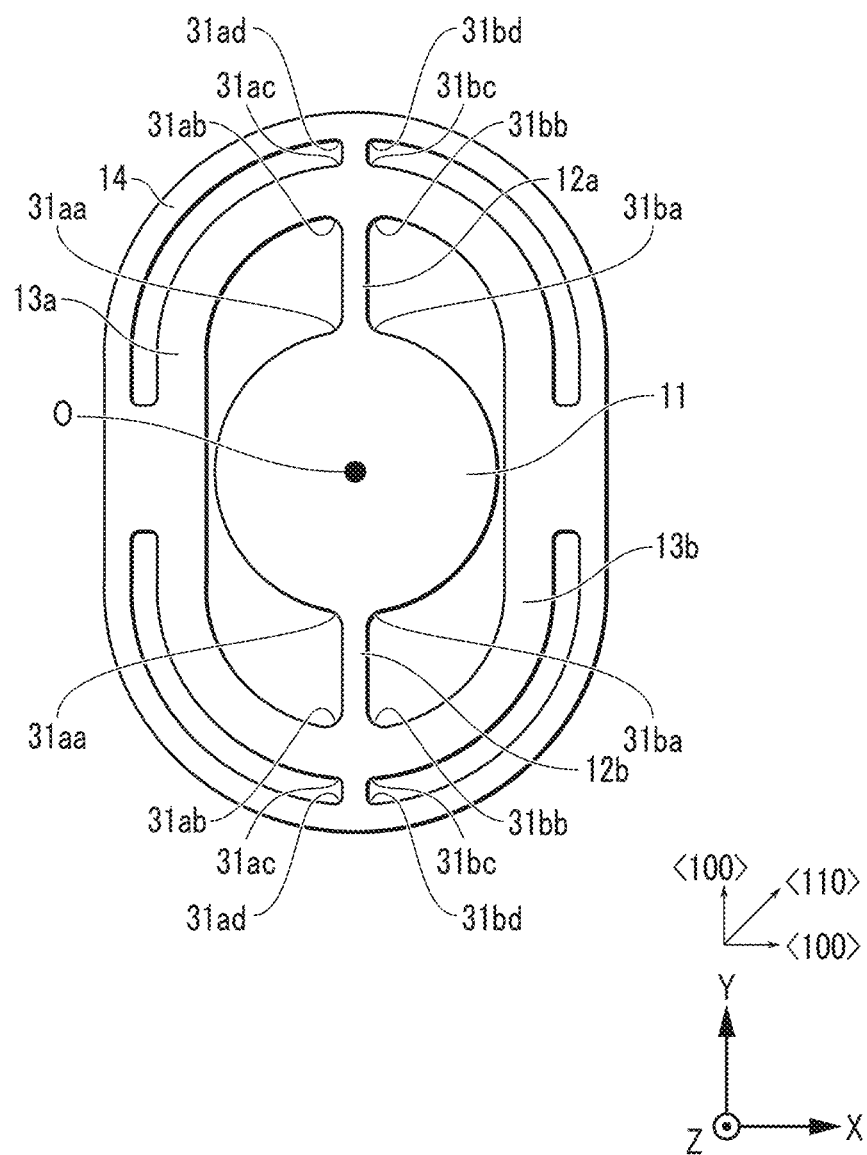
FIG. 3 is an enlarged diagram of a range including torsion bars.

FIG. 3 is an enlarged diagram of a range including the torsion bars 12a, 12b in FIG. 1. In such a central section, the movable frame part 14, the mirror part 11, the torsion bars 12a, 12b, and the inside piezoelectric actuators 13a, 13b internally surrounded by the movable frame part 14, are included. In FIG. 3, the three axis coordinate system of X axis-Y axis-Z axis, and directions of crystal orientations are illustrated. The X axis and the Y axis match with <100>. A direction at an angle of 45° with respect to both the X axis and the Y axis matches with <110>.

Each torsion bar 12a, 12b is joined to a circumferential portion of the mirror part 11 on the center O side, and joined to the movable frame part 1A on the side opposite to the center O. Each inside piezoelectric actuator 13a. 13b is joined to one of the torsion bars 12a, 12b in each of both edge portions having a semi-elliptical ring shape, and is joined to the inner circumference of the movable frame part 14 in the central portion of the outer circumference thereof having the shape.

Radius parts 31 are formed in joint edge portions, in which the torsion bars 12a, 12b are joined to the mirror part 11, the inside piezoelectric actuators 13a, 13b, and the movable frame part 14, to increase the strength. Each of the radius parts 31 is formed by a curved surface recessed inward.

To be more precise, radius parts 31aa and 31ba constitute joint edge portions between each of the torsion bars 12a, 12b and the mirror part 11. Radius parts 31ab and 31bb constitute joint edge portions between each of the torsion bars 12a, 12b and one of the inside piezoelectric actuators 13a, 13b on the side of the mirror part 11. Radius parts 31ac and 31bc constitute joint edge portions between each of the torsion bars 12a. 12b and one of the inside piezoelectric actuator 13 actuators 13a, 13b on the side of the movable frame part 14. Radius parts 31ad and 31bd constitute joint edge portions between each of the torsion bars 12a, 12b and the inner circumference side of the movable frame part 14.

Although the radius parts 31 are formed to reinforce the corners, a problem arises in this light deflector 10. In other words, as described above with reference to FIG. 2A and FIG. 2B, the curved surface of each radius part 31 formed in each joint edge portion of the torsion bars 12a, 12b contains a surface element facing the cleavage direction of <110>, that is, a surface element the normal line of which becomes the direction of <110> to adjust the axial direction of the torsion bars 12a, 12b to <100> of the active layer 28d. As a result, it will be easier to make cleavage progress from the portion of the surface element in the curved surface.

Figure 4:
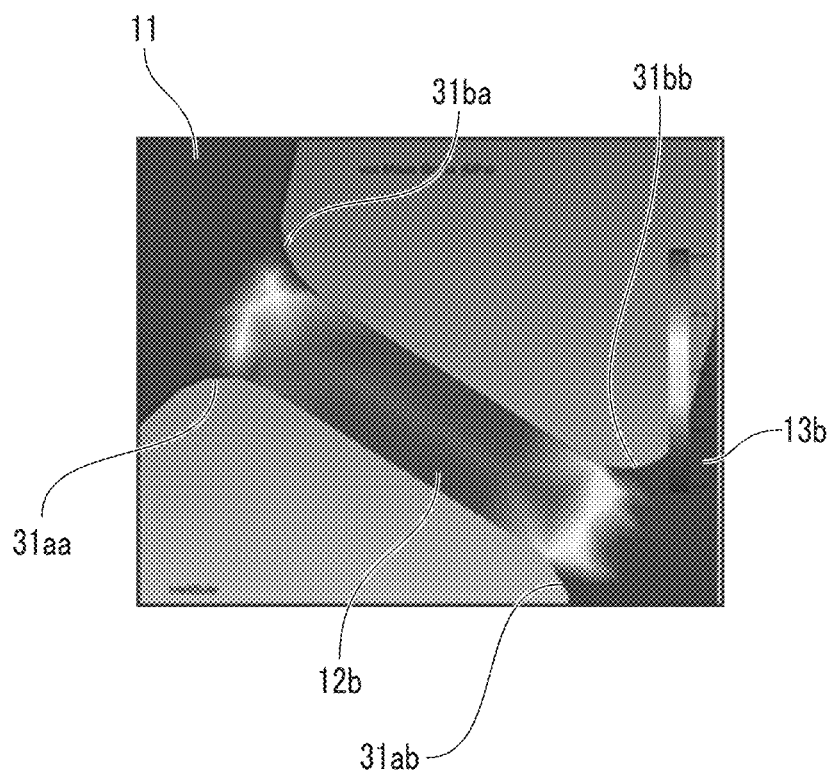
FIG. 4 is a distribution image of surface stress of a torsion bar by simulation.
Figure 5:
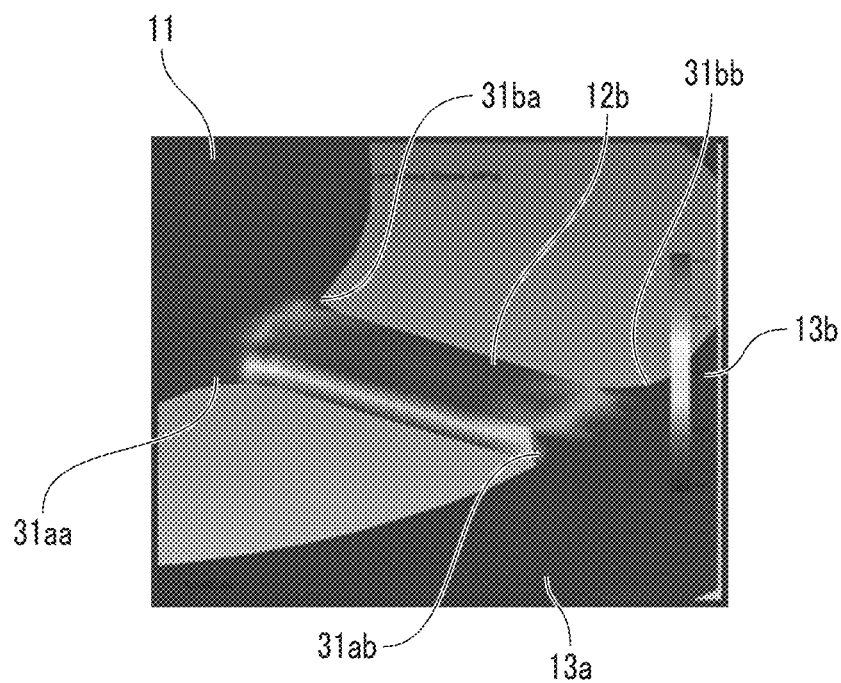
FIG. 5 is a distribution image of cross-sectional stress of the torsion bar by simulation.

FIG. 4 is a distribution image of surface stress of a torsion bar 12b by simulation. FIG. 5 is a distribution image of cross-sectional stress of the torsion bar 12b by simulation. In FIGS. 4 and 5, the whither the area, the higher the stress.

It is found from FIG. 4 and FIG. 5 that stress in portions corresponding to the radius parts 31aa, 31ba, 31ab, and 31bb (FIG. 3) is remarkably higher than that in the other portions.

Figure 6:
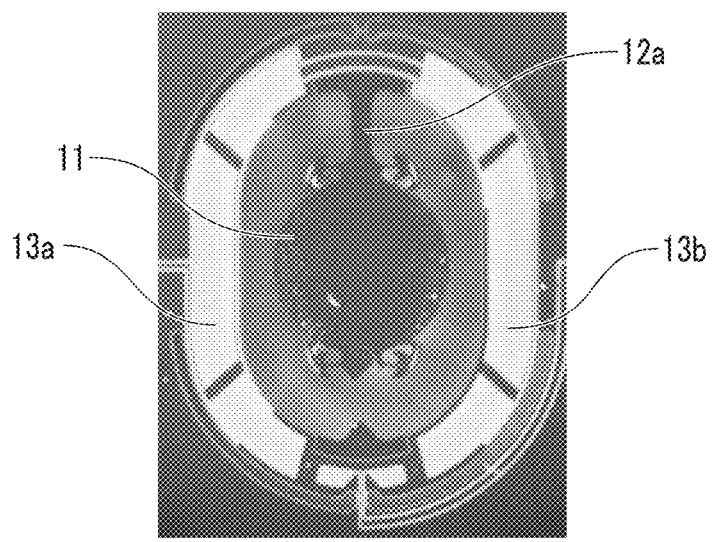
FIG. 6 is a microscopic observation image of destruction in such a light deflector that no measures have been taken against the amount of waviness of a radius part.
Figure 7:
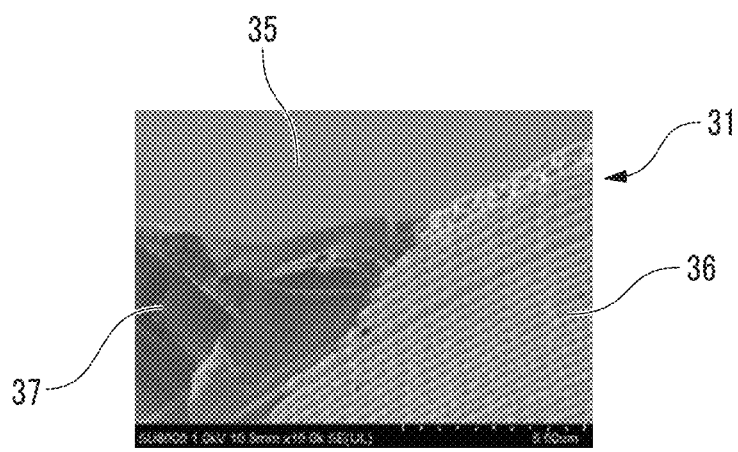
FIG. 7 is a SEM observation image of a fracture surface of FIG. 6 observed from a predetermined direction.

FIG. 6 is a microscopic observation image of the destruction of one torsion bar 12b in such a light deflector 10 that no measures have been taken against the amount of waviness of radius parts 31 to be described later. FIG. 7 is a SEM observation image of a fracture surface 37 of FIG. 6 observed from a predetermined direction.

In FIG. 6, the torsion bar 12b is broken between the mirror part 11 and the inside piezoelectric actuator 13 due to the destruction of the radius parts 31. In FIG. 7, a surface 35 (front side surface) in the neighborhood of the fracture surface 37 and a curved surface 36 are projected together with the fracture surface 37.

[Amount of Waviness]

Figure 8:
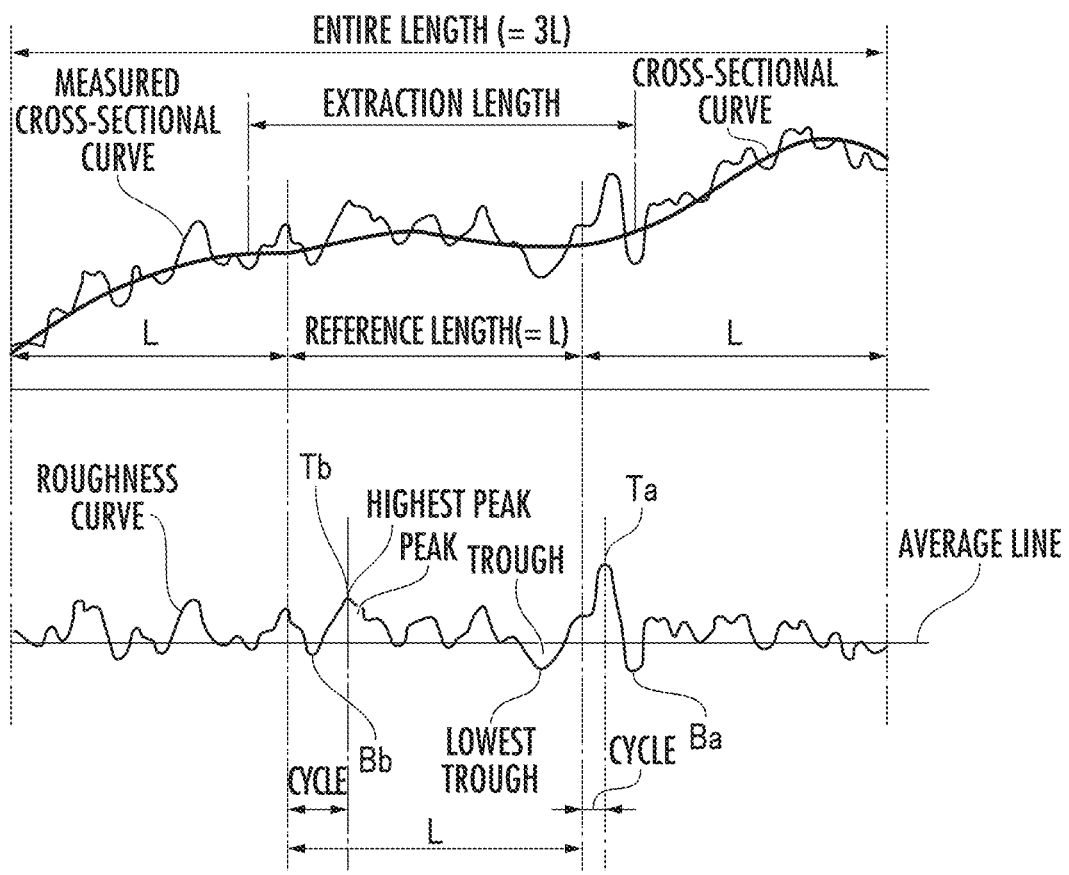
FIG. 8 is an explanatory chart of the amount of waviness when applying the JIS standard for surface roughness to a curved surface of the radius part.

FIG. 8 is an explanatory chart on the amount of waviness when applying the JIS standard for surface roughness to the radius parts 31. The JIS standard is specifically "JIS B 0601-1994," but it is assumed that other equivalent standards are also included.

In "JIS B 0601-1994," measured cross-sectional curve, cross-sectional curve, reference length, roughness curve, peak, trough, highest peak, lowest trough, and average line are defined for surface roughness. Each word/phrase in FIG. 8 conforms to the definitions thereof.

The measured cross-sectional curve is a contour line when the curved surface of a radius part 31 is cut out in a predetermined cross section parallel to the X-Y plane (for example, the cross section passing through the center of thickness in the Z axis). Here, both ends of the contour line are set to positions in which the contour of the radius part 31 is parallel to <100>. The measured cross-sectional curve is divided into three equal sections in a direction of the reference length (the horizontal axis of FIG. 8). The length of each divided section in the direction of the reference length is denoted by L.

Here, "waviness curve," "cycle," and "amount of waviness" are defined separately from the JIS standard described above.

The waviness curve shall be a contour line when the radius part 31 is cut out on a plane parallel to the principal surface of the SOI wafer 25. In the JIS standard described above, the average line by the method of least squares is set with respect to the measured cross-sectional curve. In the calculation of the next amount of waviness, the average line by the method of least squares is set with respect to the waviness curve. Then, distance of each position on the waviness curve from the average line is defined as the amount of waviness.

The cycle shall be a section between the highest peaks when the roughness curve is replaced with the waviness curve in FIG. 8. Further, the plane mentioned above is the surface of the radius part 31. Since the surface of the radius part 31 is located in a shallow position from the surface of the light deflector 10, it is easy to measure the contour line of the radius part 31.

In FIG. 8, Ta and Ba denote the maximum amount of waviness and the minimum amount of waviness in a cycle in which a difference between the maximum amount of waviness and the minimum amount of waviness is maximized in the entire cycle of the radius part 31. Tb and Bb denote the maximum amount of waviness and the minimum amount of waviness in a cycle in which a difference between the maximum amount of waviness and the minimum amount of waviness is maximized among circles included in the center section of the three equal sections. There is a relation of Tb-Bb difference ≤Ta-Ba difference.

Figure 9:
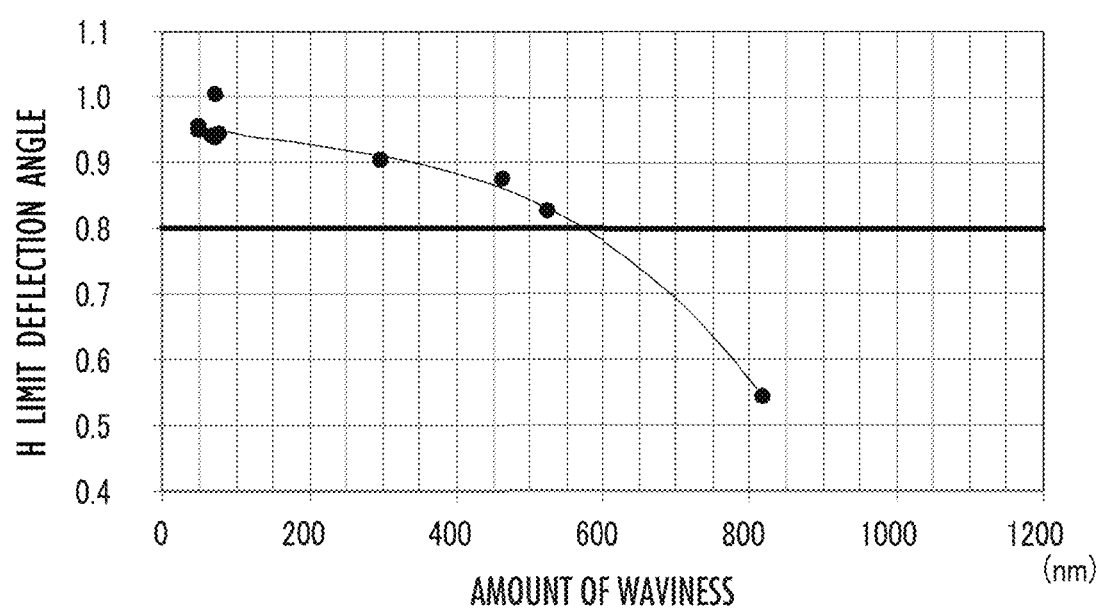
FIG. 9 is a graph illustrating a relationship between the amount of waviness of the radius part and limit deflection angle.

FIG. 9 is a graph illustrating a relationship between the amount of waviness of the radius part 31 and H limit deflection angle. Here, the "H limit deflection angle" is the maximum deflection angle of the mirror part 11 about the rotation axis 22y when one of the torsion bars 12a, 12b is broken. In order to prevent such breakage, the light deflector 10 must be used by setting the deflection angle of the mirror part 11 about the rotation axis 22y to an angle less than the H limit deflection angle.

Note that there are two kinds of deflection angles of the mirror part 11, that is, a deflection angle about the rotation axis 22y and a deflection angle about the rotation axis 22x. When distinguishing between both deflection angles, the deflection angle about the rotation axis 22y is called the "H deflection angle," and the deflection angle about the rotation axis 22x is called the "V deflection angle." Then, when the mirror part 11 faces straight ahead, it is defined that the H deflection angle and the V deflection angle are both 0°. Note further that each of the deflection angles is a mechanical deflection angle.

In FIG. 9, each numerical value on the vertical axis means a relative value of the H limit deflection angle. H limit deflection angle=1.0 means the maximum allowed value of the H limit deflection angle when the light deflector 10 is used as an in-vehicle product. When the light deflector 10 is actually sold as a product, there is a need to guarantee H limit deflection angle=0.8 or more, that is, 20% less than the maximum allowed value. To do that, the amount of waviness of the curved surface of the radius part 31 has only to be set within 600 nm as can be found from FIG. 9.

[Suppression of Cleavage]

A structure to suppress the cleavage of the radius parts 31 in the light deflector 10 will be described. For all cycles included in predetermined radius parts 31 (particularly, at least either the radius parts 31aa, 31ba or the radius parts 31ab, 31bb), a difference between the maximum amount of waviness and the minimum amount of waviness in each cycle is set equal to or less than 600 nm. Thus, even when each radius part 31 has a portion to turn the normal line in the direction of the crystal orientation of <110>, cleavage from the portion can be effectively prevented. Note that at least either one of them is typically the radius parts 31ab, 31bb.

In other words, the above measures are so taken that each radius part 31 is formed by a cylindrically curved surface recessed inward as the joint edge portion between respective elements. The predetermined section of the radius part 31 is so formed that the unevenness against the cylindrically curved surface is 600 nm or less.

Both ends of the predetermined section (for example, which correspond to both ends of an extraction length in FIG. 8) are set outside of both ends of a center divided section when the cylindrical curved surface is divided into the three equal sections. The center divided section corresponds to the center curved section among the three curved sections in the reference length direction (vertical axis direction) in the roughness curve of FIG. 8.

The cylindrical curved surface includes an ideal side of a cylinder (a side with an unevenness of 0). Further, the cylindrical curved surface shall include a side whose unevenness falls within a predetermined first threshold value for the ideal side of the cylinder, and a curved surface whose unevenness falls within the predetermined first threshold value and whose amount of upheaval or amount of depression per unit length in any direction of the side falls within a second threshold value.

The reason for setting both ends of a predetermined section outside of both ends of the center divided section is as follows. Namely, this is because the axial direction of the torsion bar 12 is the crystal orientation of <100> of the silicon single crystal layer, and hence the cleavage direction in the radius part 31 exists within the center divided section when the cylindrical curved surface is divided into three equal sections.

[Manufacturing Method]

Figure 10:
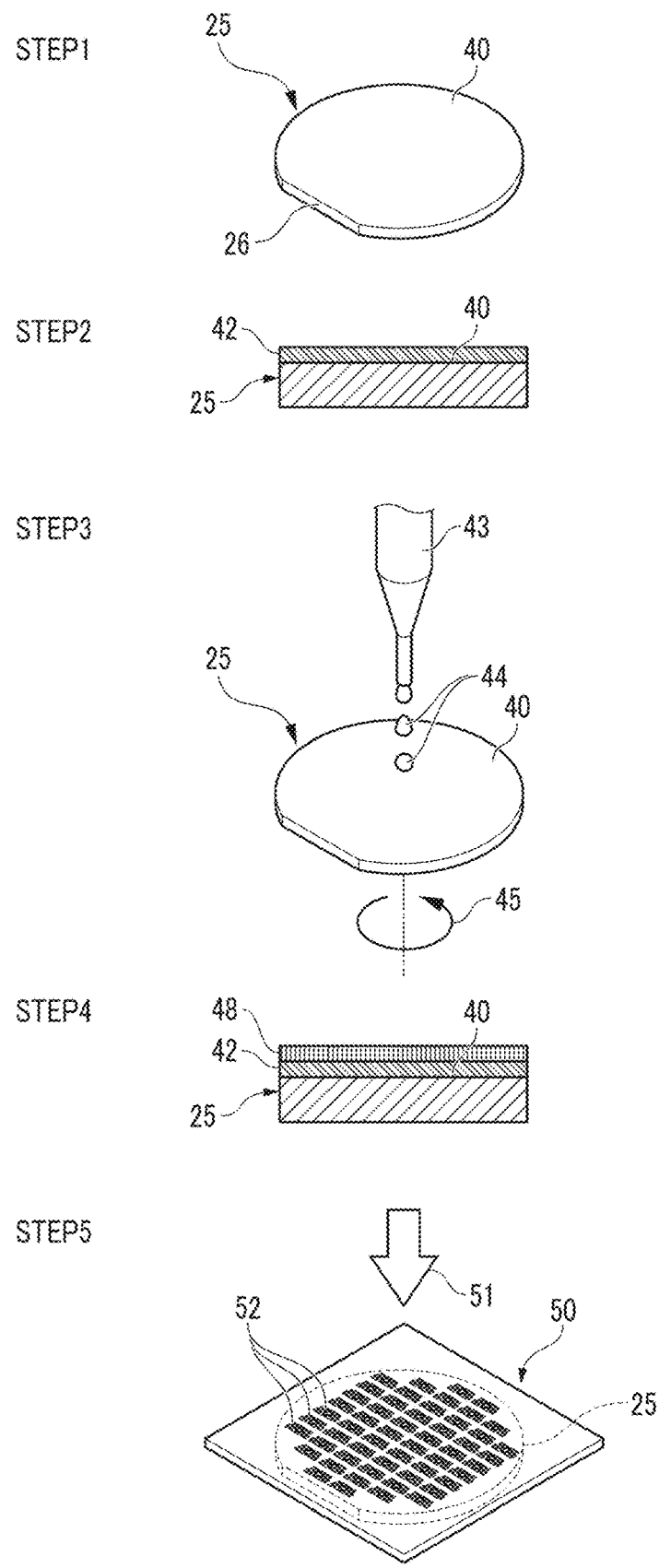
FIG. 10 is a process diagram of a manufacturing method for the light deflector.

FIG. 10 is a process diagram of a manufacturing method for the light deflector 10 to make the amount of waviness of the radius parts 31 within 600 nm, which is particularly an example of an SOI processing process.

In STEP1, an SOI wafer 25 (the SOI wafer 25a in FIG. 2A or the SOI wafer 25b in FIG. 2B) is prepared.

Next, in STEP2, an element forming layer 42 is formed on a surface 40 of the SOI wafer 25. Specifically, the element forming layer 42 is an electrode layer 42a, a piezoelectric layer 42b, and an electrode layer 42c in FIG. 11.

STEP3 corresponds to a coating process. In STEP3, the operation of spin rotation 45 is performed while dripping a photosensitizer 44 on the SOT water 25 with the surface 40 thereon from a nozzle 43. Thus, the photosensitizer 44 spreads evenly on the surface of the element forming layer 42.

In a conventional photosensitizer coating process, AZ4620 (viscosity: 400 cSt) is used as the photosensitizer. Further, the spin rotation 45 is 1000 rpm to 2000 rpm. By doing this, the film thickness of a resist film layer formed on the surface of the element forming layer 42 gets thicker than 10 μm. When the rotational speed of the spin rotation 45 increases to make the film thickness of the resist film layer 48 thinner, the film thickness unevenness increases in turn.

On the contrary, in STEP3, AZ6130 (viscosity: 70 cSt) is used as the photosensitizer 44. Further, the spin rotation 45 is 500 rpm to 1000 rpm. By doing this, the resist film layer 48 the film thickness of which is made uniform is formed on the surface side of the element forming layer 42 in STEP4. Thus, the film thickness of the resist film layer 48 becomes not thinner than 5 μm and not thicker than 10 μm.

Note that if the film thickness is thinner than 5 μm, a MEMS uneven step structure cannot be covered. On the other hand, if the film thickness exceeds 10 μm, the photosensitizer 44 cannot be coated evenly on the surface of the element forming layer 42, and hence the condition that the amount of waviness of the curved surface of the radius part 31 is within 600 nm cannot be satisfied.

In STEP5, a photomask 50 covers the SOI wafer 25 with the resist film layer 48 thereon. The photomask 50 has patterns 52 according to the number and arrangement of light deflectors 10 to be manufactured from one SOI wafer 25.

In STEP5, ultraviolet light 51 is further irradiated from the surface side of the photomask 50 as an exposure process of the present invention. Areas of the resist film layer 48 corresponding to the patterns 52 of the photomask 50 are exposed by the ultraviolet light 51.

FIG. 11 is a cross-sectional view of the light deflector 10 manufactured further through an etching process after STEP5, The SOI wafer 25 has a structure in which an SiO2 layer 28a, the support layer 28b, an SiO2 layer 28c, the active layer 28d, and an SiO2 layer 28e are laminated from the back side to the surface side. The element forming layer 42 has a structure in which the electrode layer 42a, the piezoelectric layer 42b, and the electrode layer 42c are laminated in this order from the side of the SOI wafer 25.

The mirror part 11 has a metal layer 54 that covers the surface of the SiO2 layer 28e, The surface of the metal layer 54 is a reflective surface of light incident on the mirror part 11 from an unillustrated light source. The active layer 28d forms a common substrate layer of the mirror part 11, the inside piezoelectric actuators 13a, 13b, and the outside piezoelectric actuators 15a, 15b.

Figure 12A:
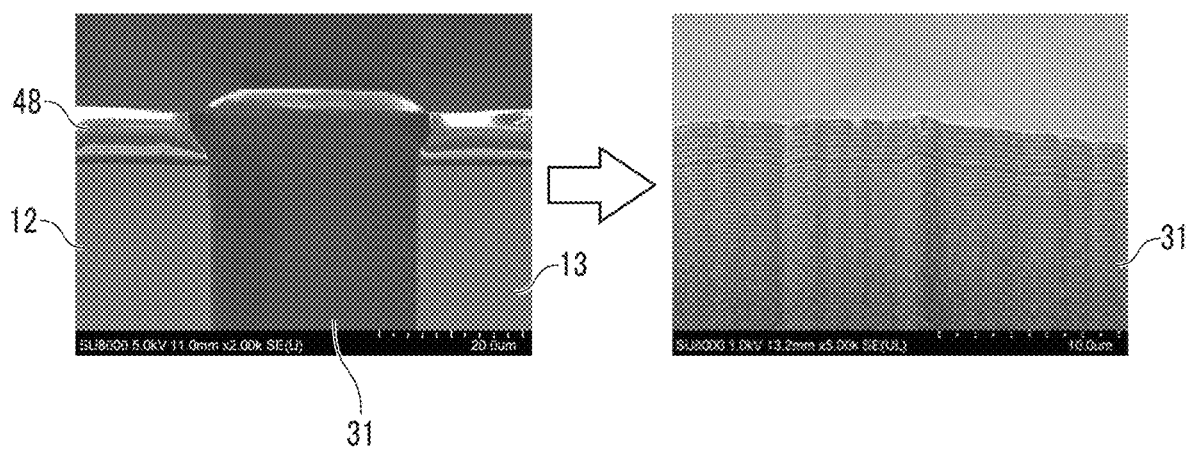
FIG. 12A is a SEM observation image in which a section of a resist film layer exceeding 10 μm as a stipulated film thickness and the amount of waviness when the radius part is formed by the resist film layer have been observed.
Figure 12B:
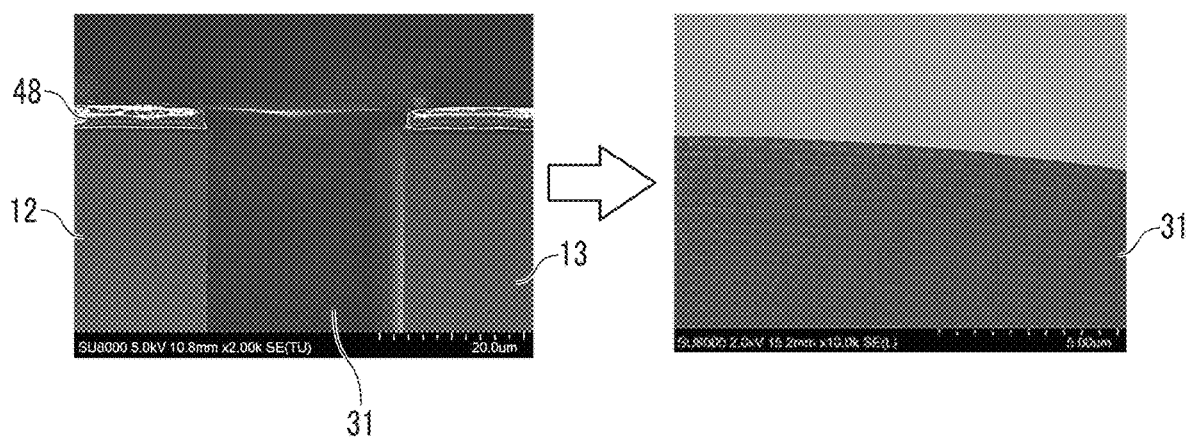
FIG. 12B is a SEM observation image in which a section of the resist film layer within 10 μm as the stipulated film thickness and the amount of waviness when the radius part is formed by the resist film layer have been observed.

FIG. 12A is a SEM observation image in which a section of the resist film layer 48 exceeding 10 μm as the stipulated film thickness of the resist film layer 48 and the amount of waviness of the curved surface of the radius part 31 manufactured with the film thickness have been observed. FIG. 12B is a SEM observation image in which a section of the resist film layer 48 within 10 μm as the stipulated film thickness of the resist film layer 48 and the amount of waviness of the curved surface of the radius part 31 manufactured with the film thickness have been observed.

From the comparison between the SEM observation images of FIG. 12A and FIG. 12B, it can be understood that, when the film thickness of the resist film layer 48 is set less than stipulated 10 μm, the curved surface of the radius part 31 manufactured with the film thickness can be kept within desired 600 nm.

Modifications and Supplements

The light deflector 10 of the embodiments of the two-axis type, that is, a light deflector which two-dimensionally scans scanning light from the mirror part. However, the light deflector of the present invention may also be of the one-axis type, drat is, a light deflector which one-dimensionally scans scanning light from the mirror part.

The light deflector 10 of the embodiment is such that each torsion bar reaches the inner circumference of the movable frame part 14 (movable frame) beyond the joint portion with each of the inside piezoelectric actuators 13a, 13b as the piezoelectric actuator in the Y axis direction and is joined to the inner circumference thereof. However, in the light deflector of the present invention, the torsion bar does not have to be joined to the movable frame part 14 as a support part.

In the embodiment, the photosensitizer 44 using AZ6130 (viscosity: 70 cSt) as a photoresist film is adopted as the resist film layer 48. However, the photosensitizer to form the photoresist film of the present invention is of any type as long as the surface side of the substrate before the exposure process can be covered with a uniform photoresist film of not thinner than 5 μM and not thicker than 10 μm.

The radius parts 31aa and 31ba of the embodiment correspond to first radius parts of the present invention. The radius parts 31ab and 31bb correspond to second radius parts of the present invention. In the embodiment, the entire surface 40 of the SOI wafer 25 is covered with the resist film layer 48 the film thickness of which is not thinner than 5 μm and not thicker than 10 μm as described in STEP4 of FIG. 10. Therefore, in addition to the radius parts 31aa, 31ba, 31ab, 31bb, the amount of waviness of the radius parts 31ac, 31bc, 31ad, 31bd on the other side, and further radius parts of coupling portions of the cantilevers 19 coupled with each other as a meander pattern are kept within 600 nm. In the present invention, the radius parts whose amount of waviness is within 600 nm are only radius parts 31ab and 31bb is allowed.

In the embodiment, the entire surface 40 of the SOI wafer 25 is covered with the resist film layer 48 the entire film surface thickness of which is thinner than 5 μm and not thicker than 10 μm as described in STEP4 of FIG. 10. Therefore, a difference between the maximum amount of waviness and the minimum amount of waviness in each cycle included in the entire length of the roughness curve of each radius part can be set to 600 nm or less without limiting each cycle included in a range of the extraction length of the roughness curve of the radius part.

DESCRIPTION OF REFERENCE NUMERALS

10 . . . light deflector, 11 . . . mirror part, 12 . . . torsion bar, 13 . . . inside piezoelectric actuator, 14 . . . movable frame part, 22x, 22y . . . rotation axis, 25 . . . SOI wafer, 28d . . . active layer, 31 . . . radius part, 36 . . . curved surface, 40 . . . surface, 42 . . . element forming layer, 44 . . . photosensitizer, 45 . . . spin rotation, 48 . . . resist film layer, 52 . . . pattern.

The invention claimed is:

1. A light deflector comprising:
a mirror part which can turn reciprocally about a predetermined rotation axis;
a pair of torsion bars extending from both sides of the mirror part along the rotation axis of the mirror part;
a frame part which surrounds the mirror part and the pair of torsion bars;
a plurality of piezoelectric actuators intervening between the torsion bars and the frame part to cause torsional vibration of each torsion bar about the rotation axis so as to reciprocally turn the mirror part about the rotation axis;
first radius parts each of which is formed by a cylindrical curved surface recessed inward in a joint edge portion between each torsion bar and the mirror part; and
second radius parts each of which is formed by a cylindrical curved surface recessed inward in a joint edge portion between each piezoelectric actuator on a side facing the mirror part and a respective one of the torsion bars, wherein:
a substrate layer of the mirror part, the torsion bars, and the piezoelectric actuators is a common silicon single crystal layer,
a plane index of a principal surface of the silicon single crystal layer is either one of (100) and (110),
an axial direction of the torsion bars is <100> as a crystal orientation of the silicon single crystal layer,
the first radius parts are set outside of both ends of a center divided section when the cylindrical curved surface is divided into three equal sections and are so formed that a contour line when each first radius part is cut out on a plane parallel to the principal surface is set as a waviness curve,
an average line of waviness curves is set by a method of least squares,
an adjacent peak to peak section of the waviness curve is set as a cycle,
a distance from the average line at each position of the waviness curve is set as an amount of waviness, and
a difference between a maximum amount of waviness and a minimum amount of waviness in each cycle is 600 nm or less over the whole cycle.

2. The light deflector according to claim 1, wherein the second radius parts are set outside of both ends of a center divided section when the cylindrical curved surface thereof is divided into three equal sections, and a difference between a maximum amount of waviness and a minimum amount of waviness in each cycle thereof is 600 nm or less over the whole cycle.

3. A light deflector comprising:
a mirror part which can turn reciprocally about a predetermined rotation axis;
a pair of torsion bars extending from both sides of the mirror part along the rotation axis of the mirror part;
a frame part which surrounds the mirror part and the pair of torsion bars;
a plurality of piezoelectric actuators intervening between the torsion bars and the frame part to cause torsional vibration of each torsion bar about the rotation axis so as to reciprocally turn the mirror part about the rotation axis;
first radius parts each of which is formed by a cylindrical curved surface recessed inward in a joint edge portion between each torsion bar and the mirror part; and
second radius parts each of which is formed by a cylindrical curved surface recessed inward in a joint edge portion between each piezoelectric actuator on a side facing the mirror part and a respective one of the torsion bars,
wherein:
a substrate layer of the mirror part, the torsion bars, and the piezoelectric actuators is a common silicon single crystal layer,
a plane index of a principal surface of the silicon single crystal layer is either one of (100) and (110),
an axial direction of the torsion bars is <100> as a crystal orientation of the silicon single crystal layer,
the second radius parts are set outside of both ends of a center divided section when the cylindrical curved surface is divided into three equal sections and are so formed such that a contour line when each second radius part is cut out on a plane parallel to the principal surface is set as a waviness curve,
an average line of waviness curves is set by a method of least squares,
an adjacent peak to peak section of the waviness curve is set as a cycle,
a distance from the average line at each position of the waviness curve is set as an amount of waviness, and
a difference between a maximum amount of waviness and a minimum amount of waviness in each cycle is 600 nm or less over the whole cycle.

4. A manufacturing method for a light deflector, the light deflector including: a mirror part which can turn reciprocally about a predetermined rotation axis; a pair of torsion bars extending from both sides of the mirror part along the rotation axis of the mirror part; a frame part which surrounds the mirror part and the pair of torsion bars; a plurality of piezoelectric actuators intervening between the torsion bars and the frame part to cause torsional vibration of each torsion bar about the rotation axis so as to reciprocally turn the mirror part about the rotation axis; first radius parts each of which is formed by a cylindrical curved surface recessed inward in a joint edge portion between each torsion bar and the mirror part; and second radius parts each of which is formed by a cylindrical curved surface recessed inward in a joint edge portion between each piezoelectric actuator on a side facing the mirror part and a respective one of the torsion bars, wherein a substrate layer of the mirror part, the torsion bars, and the piezoelectric actuators is a common silicon single crystal layer, a plane index of a principal surface of the silicon single crystal layer is either one of (100) and (110), an axial direction of the torsion bars is <100> as a crystal orientation of the silicon single crystal layer, the first radius parts are set outside of both ends of a center divided section when the cylindrical curved surface is divided into three equal sections and are so formed that a contour line when each first radius part is cut out on a plane parallel to the principal surface is set as a waviness curve, an average line of waviness curves is set by a method of least squares, an adjacent peak to peak section of the waviness curve is set as a cycle, a distance from the average line at each position of the waviness curve is set as an amount of waviness, and a difference between a maximum amount of waviness and a minimum amount of waviness in each cycle is 600 nm or less over the whole cycle, the manufacturing method comprising:
a coating process in which a surface of a substrate including an active layer of silicon single crystal with a plane index of a principal surface being either one of (100) and (110) is covered with a photoresist film with a film thickness of not thinner than 5 μm and not thicker than 10 μm;
an exposure process in which a surface side of the substrate after the coating process is exposed through a photomask including a contour pattern of contours of the mirror part, the torsion bars, the piezoelectric actuators, the first radius parts, and the second radius parts of the light deflector; and
a contouring process in which the surface side of the substrate is etched to form, on the active layer, the contours of the mirror part, the torsion bars, the piezoelectric actuators, the first radius parts, and the second radius parts of the light deflector.

* * * * *